United States Patent
Hazard

(10) Patent No.: US 6,977,577 B2
(45) Date of Patent: Dec. 20, 2005

(54) METHOD FOR AUTHENTICATING A PORTABLE OBJECT, CORRESPONDING PORTABLE OBJECT, AND APPARATUS THEREFOR

(75) Inventor: Michel Hazard, Mareil sur Mauldre (FR)

(73) Assignee: CP8 Technologies, Paris (FR)

( * ) Notice: Subject to any disclaimer, the term of this patent is extended or adjusted under 35 U.S.C. 154(b) by 367 days.

(21) Appl. No.: 10/030,255

(22) PCT Filed: May 4, 2001

(86) PCT No.: PCT/FR01/01359

§ 371 (c)(1),
(2), (4) Date: Jan. 9, 2002

(87) PCT Pub. No.: WO01/86601

PCT Pub. Date: Nov. 15, 2001

(65) Prior Publication Data

US 2003/0098775 A1    May 29, 2003

(30) Foreign Application Priority Data

May 9, 2000    (FR) .................... 00 05894

(51) Int. Cl.⁷ .......... G05B 19/00; G06F 7/00; G08B 29/00; H04B 1/00; H04Q 1/00
(52) U.S. Cl. .......... 340/5.8; 340/5.81; 380/247
(58) Field of Search .............. 380/25, 4, 21, 380/22, 23, 24, 244, 229; 340/5.8, 5.81, 5.85, 340/5.86; 455/411, 433; 713/155–159; 235/380, 235/382, 379

(56) References Cited

U.S. PATENT DOCUMENTS

| | | | | |
|---|---|---|---|---|
| 4,656,463 A | * | 4/1987 | Anders et al. | 340/573.4 |
| 4,786,790 A | * | 11/1988 | Kruse et al. | 235/380 |
| 4,896,261 A | * | 1/1990 | Nolan | 710/107 |
| 5,097,115 A | * | 3/1992 | Ogasawara et al. | 235/380 |
| 5,225,664 A | * | 7/1993 | Iijima | 235/380 |
| 5,661,806 A | * | 8/1997 | Nevoux et al. | 380/247 |
| 6,167,516 A | * | 12/2000 | Camion et al. | 713/168 |
| 6,198,823 B1 | * | 3/2001 | Mills | 380/247 |
| 6,225,888 B1 | * | 5/2001 | Juopperi | 340/5.8 |
| 6,363,151 B1 | * | 3/2002 | Linder | 380/247 |
| 6,556,680 B1 | * | 4/2003 | Leonardi | 380/247 |

FOREIGN PATENT DOCUMENTS

| | | |
|---|---|---|
| EP | 0 281 058 A | 9/1988 |
| EP | 0 475 837 A | 3/1992 |
| EP | 0 531 194 A | 3/1993 |
| EP | 0 926 624 A | 6/1999 |
| FR | 2 757 979 A | 7/1998 |
| WO | WO 98 37663 A | 8/1998 |

* cited by examiner

Primary Examiner—Michael Horabik
Assistant Examiner—Nam Nguyen
(74) Attorney, Agent, or Firm—Miles & Stockbridge P.C.; Edward J. Kondracki

(57) ABSTRACT

A method is described for authenticating a portable object that includes a processor and a memory. The memory contains at least one code defining operations capable of being executed by the portable object, as well as a one-way function. The method comprises an authentication of the portable object which includes sending the portable object an order so that the latter executes a calculation of a result by applying to the one way function at least part of the code. This result enters into the implementation of a given operation, the operation being performed successfully only when the portable object is authentic.

14 Claims, 2 Drawing Sheets

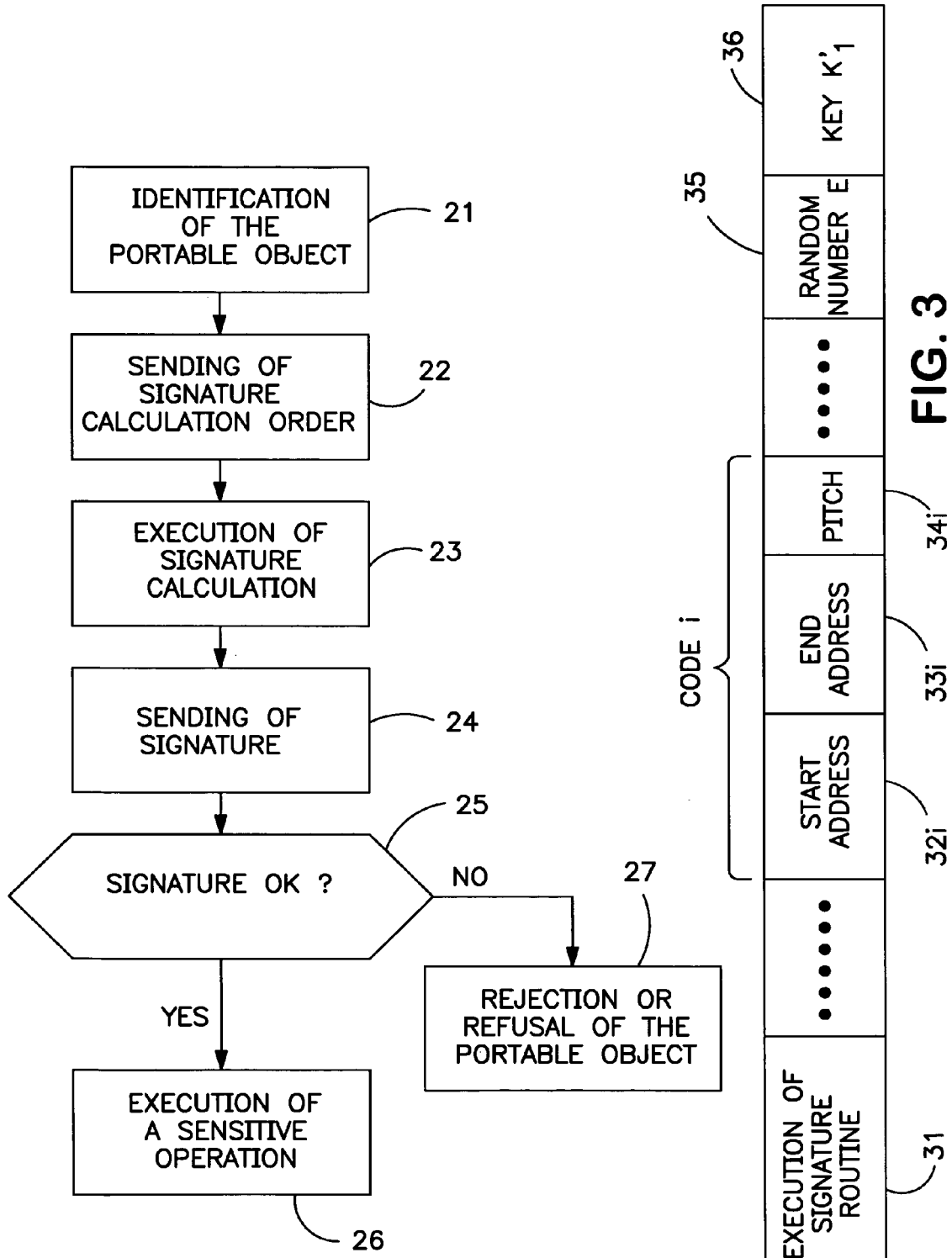

METHOD FOR AUTHENTICATING A PORTABLE OBJECT, CORRESPONDING PORTABLE OBJECT, AND APPARATUS THEREFOR

BACKGROUND OF THE INVENTION

1. Field of the Invention

This invention relates to product security, and more particularly to a system and method for verifying the authenticity of a product or service in connection with a personal, business, or commercial transaction.

2. Description of the Related Art

Many fields of activity today use portable objects comprising information processing means and information storage means, particularly in the form of microprocessor cards, to protect access to the services they offer. While offering a high level of security, these portable objects do not provide total security; for the most sensitive applications (electronic purse, debit/credit card for payment, pay television), authentication of the portable object by means of symmetric or even asymmetric cryptography has proven insufficient. In essence, this means of authentication is based on the portable objects' holding of secret keys. Experience has shown that highly competent hackers having substantial means at their disposal can succeed in discovering secret keys, even when they are located in storage areas that are normally inaccessible from outside the portable objects. A corrupted secret key allows a hacker or a fraudulent organization to profit substantially by selling low priced, cloned portable objects that offer the same services as the authentic portable objects. The hacker produces a portable object that is a clone of the authentic portable object by producing a product that fulfills the functions of the authentic portable object, without supporting anything that would limit the use of the portable object or anything related to the security of the product.

In the field of chip cards, when a telecommunications or television operator or a banking institution uses the card, it establishes an approval procedure for the product, which includes two parts:
1) the functional certification of the product, which guarantees compliance with the specifications;
2) the security evaluation of the product, which makes it possible to verify that the security requirements are met.

Once the product is approved (in terms of hardware and software), there is no way to verify that a card has gone through an approval procedure, other than via authentication using a secret key, which presupposes that this key has not been corrupted in any way and can therefore only be associated with an approved product.

SUMMARY OF THE INVENTION

The object of the present invention consists in offering a solution to the problem posed. The basic idea is that a secret key must not be dissociated from the product that uses it, and particularly from the code or program executed by the information processing means of the portable object. Consequently, it is important to dynamically authenticate the code before trusting the keys. A "dynamic authentication" means an authentication performed repeatedly over the life of the portable object, more precisely, during the various sessions in which the portable object is used. For example, in the pay television field, the code is authenticated during the transmission, at predetermined time intervals; in the payment field, the code is authenticated during each transaction performed when the terminal cooperating with the portable object is in a mode in which it is "connected" to an authority.

To this end, the invention concerns a method for authenticating a portable object comprising information processing means and information storage means, the information storage means containing at least one code defining operations capable of being executed by the portable object, as well as a one-way function, characterized in that it comprises the step that consists of sending the portable object an order so that the latter executes a calculation of a result by applying to said one-way function at least part of said code, this result being used to decide whether or not the portable object is authentic.

The invention also concerns a method for having a portable object execute a sensitive operation, the portable object comprising information processing means and information storage means, the information storage means containing at least one code defining operations capable of being executed by the portable object, as well as a one-way function, characterized in that it comprises the step that consists of sending the portable object an order so that the latter executes a calculation of a result by applying to said one-way function at least part of said code, said result entering into the implementation of said sensitive operation, this operation being performed successfully only when the portable object is authentic.

The invention also concerns a portable object comprising information processing means and information storage means, the information storage means containing at least one code defining operations capable of being executed by the portable object, as well as a one-way function, characterized in that it comprises means for executing a calculation of a result by applying to said one-way function at least part of said code.

Lastly, the invention concerns a device comprising information processing means and information storage means and designed to communicate with a portable object in order to authenticate the latter, the portable object comprising information processing means and information storage means, the information storage means of the portable object containing at least one code defining operations capable of being executed by the portable object, as well as a one-way function, characterized in that it comprises means for sending the portable object an order so that the latter executes a calculation of a result by applying to said one-way function at least part of said code of the portable object.

BRIEF DESCRIPTION OF THE DRAWINGS

Other details and advantages of the present invention will emerge from the following description of a preferred but nonlimiting mode of execution, in reference to the attached drawings, in which:

FIG. 2 is a flow chart of a procedure for verifying a signature calculated by a portable object on a code it holds;

FIG. 3 represents the format of a message sent to the portable object so that the latter calculates a code signature.

DESCRIPTION OF THE PREFERRED EMBODIMENTS

Figure 1:
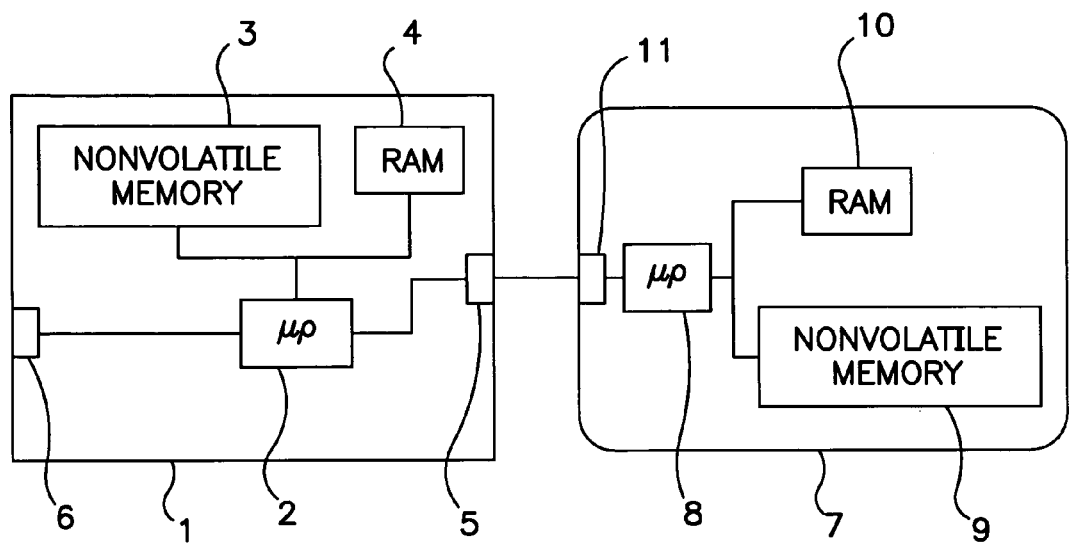
FIG. 1 represents a portable object cooperating with an information processing device.

FIG. 1 represents an information processing device 1 cooperating with a portable object 7. The information processing device comprises, in an intrinsically known way, information processing means 2 to which are connected a nonvolatile memory 3, a RAM 4, means 5 for cooperating, with or without physical contact, with the portable object 7, and a transmission interface 6 that allows the information processing device to communicate with an information communication network. The information processing device 1 can also be equipped with storage means such as diskettes or disks which may or may not be removable, entry means (such as a keyboard and/or a pointing device of the mouse type) and display means, these various means not being represented in FIG. 1.

The information processing device can be constituted by any computing device installed at a private or public site and capable of providing means for managing information or for delivering various goods or services, this device being permanently installed or portable. It can also be, in particular, a device dedicated to telecommunications.

Furthermore, the portable object 7 has a chip that includes information processing means 8, connected at one end to a nonvolatile memory 9 and to a volatile working memory RAM 10, and connected at the other end to means 11 for cooperating with the information processing device 1. The nonvolatile memory 9 can include a RAM part that is not modifiable and an EPROM or EEPROM part that is modifiable or constituted by a RAM of the "flash" type or FRAM (the latter being a ferromagnetic RAM), i.e., having the characteristics of an EEPROM but with access times identical to those of a conventional RAM.

For the chip, it is possible to use, in particular, a self-programmable microprocessor with a nonvolatile memory, as described in U.S. Pat. No. 4,382,279 in the name of the Applicant. In a variant, the microprocessor of the chip is replaced—or at least supplemented—by logic circuits installed in a semiconductor chip. In essence, such circuits are capable of performing calculations, particularly authentication and signature calculations, because of their hardwired, rather than microprogrammed, logic. They can particularly be of the ASIC ("Application Specific Integrated Circuit") type. Advantageously, the chip is designed in monolithic form.

The portable object stores, in an area of its nonvolatile memory 9 that is preferably accessible only to the processing means 8, an operating code or program that includes any or all of the following programs:

an operating system corresponding to a program that manages the basic functions of the portable object;

a program that performs an interpretation between a system language and a higher-level language;

one or more application programs corresponding to one or more applications offered by the portable objects (bank card application, electronic purse application, personnel access control applications, etc.).

Preferably, as explained below, this code will include a "machine program" part, or program written with a language specific to the processing means 8.

This code can be stored in a masked ROM storage area or in an EEPROM storage area of the nonvolatile memory 9, or even partly in each of these areas. The code includes a signature routine capable of calculating a signature from a parameterizable part of the code. Advantageously, the signature routine comprises a function capable of calculating a packed form of the code part: this could be, for example, a checksum or a hash function such as MD5 or SHA that manipulates bits of the code by applying a mathematical function to them. The signature routine also comprises a signature algorithm capable of signing the packed form of the code part: this could be a symmetric algorithm such as Triple DES (Data Encryption Standard) in "MAC" (Message Authentication Code) mode, or an asymmetric algorithm such as RSA (from the authors Rivest, Shamir and Adleman). The signature algorithm uses a secret key $K_1$, which is either given to the portable object at the time the signature is calculated, or is stored in a secret area of the nonvolatile memory 9 of the portable object, accessible only to the information processing means 8. An advantage of the first solution is that it makes it possible to modify over time the secret key used. If the secret key $K_1$ is given to the portable object, it is preferably given in a form that is encrypted by means of another key $K_2$, the portable object, depending on the type of encryption algorithm used, holding either this same key, or a key correlated to it, for the purpose of decrypting the secret key $K_1$. In an intrinsically known way, the signature calculation, like that for encryption, involves a random number given to the portable object.

The procedure for communicating with the portable object is represented in FIG. 2. It is assumed that the terminal must give the portable object an order to execute a given sensitive operation, an operation that first requires the authentication of the code contained in the portable object. In step 21, the terminal 1 transmits to the portable object an order to read information identifying the portable object, stored in memory in the portable object and defining the type of the chip carried by this object and the version number of its operating system. In step 22, the terminal 1 transmits to the portable object a signature calculation order so that the latter executes the signature routine. According to a first embodiment in which the terminal is in a mode in which it is "connected" to an authority via an information communication network, i.e., an institution responsible for a sensitive operation to be executed by the portable object, the signature calculation order is sent by the authority, and the terminal simply transmits this order to the portable object. In a second embodiment in which the terminal is in a mode in which it is "not connected" to the authority, the signature calculation order is sent by the terminal itself. In both cases, the signature calculation order takes the form of a message whose format, according to a preferred embodiment, is represented in FIG. 3. This message includes, first of all, an order 31 to execute the signature routine. Next, it includes, for each code i, a set of codes 1 through n potentially involved in the signature calculation, a start address 32$i$ designating the place in the code i of the portable object at which the code part to be considered should start, an end address 33$i$ at which this code part should end, and a pitch 34$i$ defining, among the bytes composing the code i, those that will be considered: for example, if the pitch is equal to 7, it means that the portable object will consider, for its calculation, every seventh byte, i.e. the first byte, then the eighth, then the fifteenth, etc. The message then includes a random number E (35) that is involved in the signature calculation, followed only in the case where the secret signature key is not stored in the portable object, by this secret signature key $K_1'$ (36), encrypted. Preferably, the subsequent values change with each signature verification procedure: start addresses, end addresses, pitch, random number E; it is noted, however, that satisfactory security is already obtained by varying only one of these values.

It is noted that if any of the codes involved in the signature calculation is written in an advanced language and not in the machine language specific to the processing means 8 of the portable object, which may be the case, for example, for a banking application, the start 32i and end 33i addresses are replaced by a general identifier of this code.

Preferably, when the secret signature key $K_1'$ is present in the message, the message will also include a checksum or a signature of the message. Upon reception of the message by the portable object, the latter will recalculate the checksum or the signature, which will enable it:
to be sure of the source of the message;
to verify that there has not been any transmission problem.

In step 23, the portable object executes the signature calculation. If it has received the encrypted secret key $K_1'$, it decrypts this key by means of a decryption key. It calculates a packed form of the code parts to be considered, then signs this packed form with the secret key $K_1$, bringing the random number E into play. In step 24, the portable object transmits the signature thus calculated to the terminal 1.

When the terminal is operating in the "not connected" mode, it verifies the signature itself (step 25). Preferably, the terminal knows neither the authentic code(s) or the key $K_1$, which is assumed to be held by the portable object. The authority gives the terminal a message according to FIG. 3, excluding the key $K_1'$; and a precalculated signature that corresponds to this particular message. The terminal will send the portable object said message and, upon receiving the signature from the portable object, will verify the latter by comparing it with its precalculated signature. If the result of the comparison is positive, the code or codes of the potable object are authenticated and the terminal gives the portable object the order to execute the aforementioned sensitive operation (step 26). If negative, the terminal refuses or rejects the portable object (step 27).

When the terminal is operating in the mode where it is "connected" to an authority, it is the authority that sends the message of FIG. 3, which is then retransmitted by the terminal to the portable object. For this purpose, the authority stores in a memory the portable object's code or codes, and either the secret key $K_1$ or a key correlated to the latter. It also stores in memory the other parameters contained in the message of FIG. 3. The authority can either precalculate or recalculate the signature using the signature algorithm and the secret key $K_1$ and compare it with the signature received from the portable object (step 25) via the terminal, or use the signature received from the portable object to recalculate the packed form of the portable object's codes using an algorithm that is the inverse of the signature algorithm, and depending on the algorithm used, either the secret key $K_1$ or said key correlated to the latter; the authority then compares the packed form thus recalculated with a packed form of the codes that it holds in memory. It is also the authority that activates the execution of the sensitive operation (step 26, FIG. 2) or the refusal or rejection of the portable object (step 27), the terminal serving only as an intermediary. It is noted that the procedure in the "terminal connected to the authority" mode is more reliable than the one in the "terminal not connected to the authority" mode.

In a variant, the signature calculated by the portable object is not sent to the outside just after its calculation, but is saved in the portable object and made available to the outside world so that it can be read later.

In case of fraud, a key can generally be discovered by the hacker, allowing the latter to issue a large quantity of clone portable objects containing this key. These portable objects contain a reduced code that provides only the functionalities that are indispensable for running an application that the hacker wants to use, specifically excluding the security functions: this code is therefore different from the code or codes of the authentic portable object. The procedure of FIG. 2 will produce a signature that does not match the authentic signature, which makes it possible to distinguish all of these portable objects.

If the code or codes of the authentic portable objects contain a machine code, the authentication is even more reliable. In fact, let's assume that the hacker has succeeded, using highly advanced means, in obtaining the code contained in authentic portable object; he must then, in order for the clone portable objects to be able to be authenticated, put this code into each clone portable object in the form of a data table, in addition to the unauthentic code contained in the clone portable objects, so that the authentication calculation involves the authentic code. In essence, the clone portable object will most often use processing means different from those of the authentic portable object, i.e., using a machine code written in a different language, which machine code does not make it possible to achieve a successful authentication. The necessity for the hacker to store in each portable object, in addition to its own code, that of an authentic portable object, constitutes a substantial handicap that is capable of discouraging fraud.

The following is a first example of a sensitive operation to be protected: it consists in an operation for personalizing portable objects constituted by smart cards. This operation, performed by an authority, consists of storing, in a secret area of the cards' nonvolatile memory, "issuer" keys belonging to the institution issuing the cards in question, as well as "application" keys, which allow the cards to have access to various applications. According to the invention, the storing of these keys in a card is only done if result of the verification procedure of FIG. 2 is positive.

A second example of a sensitive operation to be protected is that of pay television. This field is subject to continuous fraud involving an image decoding device used in this application, and more recently the cards used in association with this device. The clone cards contain a reduced code that makes it possible to deliver a key for unscrambling the television image.

In a conventional operating mode, each television card periodically receives "control" messages, which contain control data (date, rights, etc., and an encrypted unscrambling key); the entire message is signed. The card verifies the signature, then decrypts the unscrambling key. According to the invention, what is delivered to the card is not the unscrambling key, but a message like that in FIG. 3, asking it to perform a calculation on a part of the card's code or codes, the result of which calculation constitutes the unscrambling key if and only if the card's code is authentic. It is therefore clear that, in this example, the card does not transmit the calculation result to an authority for its authentication, the authentication being implicit and being manifested by the actual unscrambling of the television image.

A third example of a sensitive operation to be protected concerns the field of debit/credit cards. Before the terminal authorizes a card's debit/credit operation, it activates the procedure of FIG. 2, preferably in the mode in which it is "connected" to a banking authority.

Advantageously, the institution issuing the portable objects will give the institutions using these portable objects, as a means of verifying the authenticity of these portable objects at the time of their personalization and prior to their distribution to individual users, at least one reference portable object duly authenticated by the issuing institution. The authentication of the portable object consists of calculating a signature of the code both in this portable object and in the reference portable object, the comparison of the two results making it possible to deduce the authenticity of the portable object to be verified. The selection, by the user institution, of the appropriate reference portable object from a set of reference portable objects possibly held by this institution is done using the aforementioned identification information (step 21 of FIG. 2). This method has the advantage, for the institution issuing the portable objects, of not giving the user institutions the content of the portable objects' code(s), i.e., its know-how. It is therefore more secure for it.

Advantageously, the procedure of FIG. 2 will be preceded by an operation for authenticating the person or the institution implementing this procedure, using known means based on the holding, by this person or this institution, of a PIN (Personal Identification Number) or better, a key.

According to a more advantageous variant of embodiment of the invention, the method for authenticating the portable object consists of verifying the signature of a fixed part of the code contained in this portable object, or possibly of the entire code, and not of a part of the latter that is variable at the time of each authentication procedure.

According to another, less advantageous variant of embodiment of the invention, the method for authenticating the portable object does not include the operation that consists of packing the code prior to its signature.

It is noted that if the code is stored in the portable object while leaving some memory spaces empty, it is advantageous to fill in theses spaces with a dummy code that does not fulfill any function but makes the code more voluminous, which will further impede the hacker in his attempt to copy this code into clone portable objects. "Dummy code" means a code that is written in a real language but is never used, in other words never executed. By contrast, the code actually used will be called "real code."

There is a risk that a hacker will succeed in identifying the code manipulated during the signature operation according to the invention, by observing the noise generated by the portable object. According to the invention, this risk is limited by signing the real code only from time to time, particularly at the time of operations judged to be crucial from the point of view of security. An operation of this type is, for example, the one for personalizing the portable object, in which application means are installed in the portable object, particularly application keys and codes. On the other hand, during normal operations that are less sensitive and more repetitive, the portable object will be asked to sign the dummy code.

It would be useful to prevent a hacker from passing for a given authority by interrogating the portable object using the procedure of FIG. 2, and by repeating this operation a large number of times, in order to observe the information flowing through the portable object. For this reason, and according to an improvement of the invention, the portable object is designed to limit the number of calls to the signature routine to a predetermined number.

Figure 4:
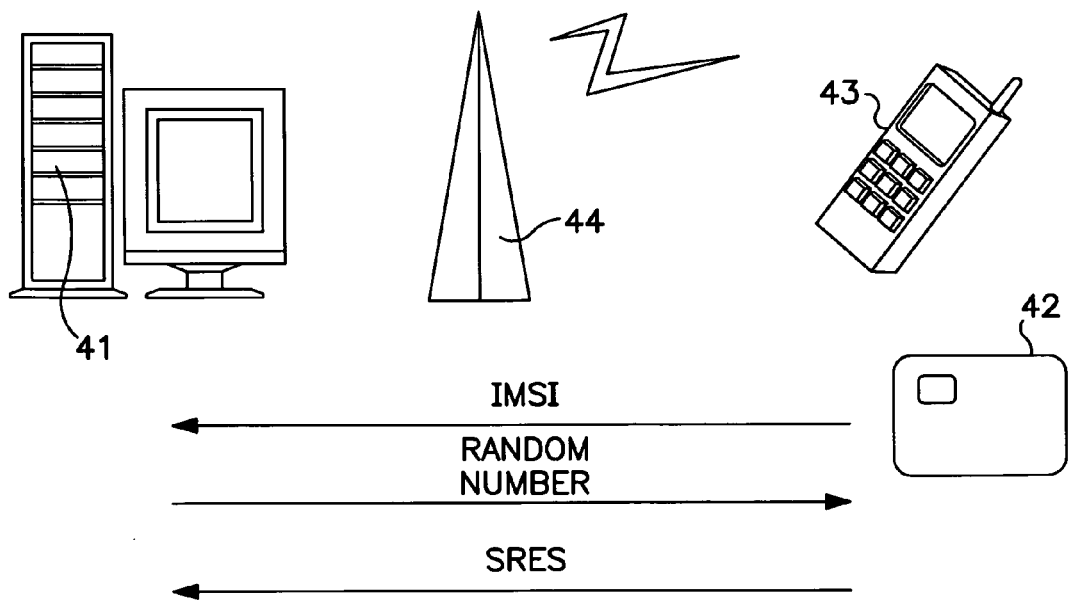
FIG. 4 represents a procedure for authenticating a smart card, in accordance with GSM standards.

An application of the invention to the GSM ("Global System for Mobile Communications") field will now be presented. FIG. 4 summarizes the method defined by the GSM standards for the authentication, by an authentication server 41, of the smart card 42 with which the mobile GSM unit 43 is equipped. It is noted that the mobile unit 43 dialogues with the server 41 via a base station 44. The method comprises a first step in which the card sends the server an IMSI identifier defining the identity of a subscriber carrying the mobile unit, as well as the identity of the card, and hence of the code contained in it. In response, the server sends the card a random number. From this random number, the card executes a command known as "RUN GSM ALGO," which calculates an authentication value called SRES' and a key $K_c$ from a key KI specific to the card. For its part, the server calculates a reference authentication value SRES'. The card then sends its authentication value SRES to the server, which compares it to its reference authentication value SRES' in order to determine whether or not the card is authentic.

According to the invention, the above authentication method is modified as follows: instead of sending the card a conventional random number constituted by a number defined by the server, the latter sends it the message of FIG. 3. Upon reception, the card calculates a code signature according to step 23 of FIG. 2, based on a given signature key $K_1$. Then, the card calculates the authentication value SRES in accordance with GSM standards, but using as a random number the result of the code signature instead of the random number normally provided by the server. Preferably, the method according to the invention will not be implemented during each session between the mobile unit and the server but only from time to time, in order to reduce the risk that a hacker will succeed in identifying the code manipulated during the signature operation according to the invention, by observing the noise generated by the card.

In the above, we have described an authentication of the portable object's code by signature calculation. In a variant, it is possible to perform this authentication by means of an encryption/decryption calculation, as is intrinsically known. In the case of a symmetric algorithm, the portable object will calculate an encrypted form of its code with a secret key and send it to the terminal or to the authority that will perform the authentication by encryption or decryption. In the case of an asymmetric algorithm, the portable object will calculate an encrypted form of its code with a public key and send it to the terminal or to the authority that will perform the authentication by encryption or decryption. In addition, we have presented in the above an authentication calculation that implements a cryptographic algorithm manipulating one or more keys, one of which is secret. An algorithm of this type, such as the above-mentioned DES or RSA, is called a "one-way trap door," the words "one-way" indicating that the function used is a one-way function, and the words "trap door" indicating that a secret exists. It is noted that a one-way function is a function that can be calculated in one direction without a particular piece of information, but which cannot be calculated in the opposite direction, unless one knows certain parameters. In the case of DES and RSA, these parameters consist in the secret key. According to the invention, the use of a "trap door" function is advantageous in that it provides additional security based on the secret key, but it is not necessary; in fact, to perform the operation for authenticating the code of the portable object, one need only perform a calculation on this code with any one way function, without any key manipulation. A one-way function is specifically a hash function such as MD5 or SHA, mentioned above.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein and defined in the claims.

I claim:

1. A method for authenticating a portable object including information processing means and information storage means connected to said information processing means, the information storage means containing at least one code defining operation steps capable of being executed by the portable object, as well as a one-way function, said method comprising:
   using an information processing device for communicating with the portable object;
   sending from said information processing device to the portable object an order to execute a calculation of a result by applying to said one-way function at least part of said code; and
   entering said result into the implementation of a given operation, said operation being performed successfully only when the portable object is authentic.

2. A method according to claim 1, wherein said operation comprises a decryption operation, said result making it possible to produce an associated decryption key.

3. A method according to claim 1, wherein said part of said code used in execution of the calculation, comprises a machine code.

4. A method according to claim 1, wherein the portable object contains a real code that defines operations designed to be executed by the portable object, and a dummy code that defines operations not designed to be executed by the portable object, said code used in the calculation of a result comprising a dummy code.

5. A method according to claim 1, further comprising repeatedly sending said order to the portable object during its life, prior to execution by the portable object of said operation steps.

6. A method according to claim 1, wherein said code used in the calculation is defined by a start address and an end address in the information storage means, and further including the step of sending said start and end addresses to the portable object.

7. A method according to claim 1, wherein said code comprises a set of binary words, said code used in the calculation being defined by a subset of said binary words comprising binary words distributed in the information storage means at a determined pitch, said pitch being sent to the portable object.

8. A method for having a portable object execute a sensitive operation, the portable object comprising information processing means and information storage means, comprising:
   storing in the information storage means at least one code that defines operations capable of being executed by the portable object, as well as a one-way function, and
   sending the portable object an order so that the portable object executes a calculation of a result by applying to said one-way function at least part of said code, said result input into the implementation of said sensitive operation, said operation being performed successfully only when the portable object is authentic.

9. A method according to claim 8, wherein the code part used in the calculation comprises a machine code.

10. A method according to claim 8, wherein the portable object contains a real code that defines operations designed to be executed by the portable object, and a dummy code that defines operations not designed to be executed by the portable object, said code part used in the calculation comprising a dummy code.

11. A portable object, comprising: information processing means and information storage means connected to said information processing means, the information storage means containing at least one code that defines operations capable of being executed by the portable object, as well as a one-way function, and means for executing a calculation of a result by applying to said one-way function at least part of said code, said result entering into the implementation of a given operation, said operation being performed successfully only when the portable object is authentic, said information processing means being connected to means for cooperating with an external information processing device distinct from the portable object, so as to receive from an external information processing device an order to execute said calculation.

12. A portable object according to claim 11, wherein said code part used in the calculation comprises a machine code.

13. A device comprising:
   information processing means and information storage means, said information processing means designed to communicate with a portable object in order to authenticate the portable object, the portable object comprising: information processing means, information storage means connected to said information processing means, the information storage means of the portable object containing at least one code that defines operations capable of being executed by the portable object, as well as a one-way function, said device further comprising means for sending the portable object an order so that the portable object determines a result by applying to said one-way function at least part of said code of the portable object, said result entering into the implementation of a given operation, said operation being performed successfully only when the portable object is authentic.

14. A device according to claim 13, wherein said code part used in the calculation comprises a machine code.

* * * * *